United States Patent [19]

Kavehrad et al.

[11] Patent Number: 4,701,909
[45] Date of Patent: Oct. 20, 1987

[54] COLLISION DETECTION TECHNIQUE FOR AN OPTICAL PASSIVE STAR LOCAL AREA NETWORK USING CSMA/CD

[75] Inventors: Mohsen Kavehrad, Holmdel; Carl-Erik Sundberg, Hazlet, both of N.J.

[73] Assignee: American Telephone and Telegraph Company, AT&T Bell Laboratories, Murray Hill, N.J.

[21] Appl. No.: 888,699

[22] Filed: Jul. 24, 1986

[51] Int. Cl.$^4$ .......................... H04J 3/02; G06F 11/00
[52] U.S. Cl. ........................................ 370/85; 370/94; 340/825.5; 371/57
[58] Field of Search ........................ 370/60, 94, 85, 99, 370/89; 340/825.5, 825.51; 371/52, 57

[56] References Cited

U.S. PATENT DOCUMENTS 4,531,239  7/1985  Usui ..................................... 455/607
4,566,098  1/1986  Gammage et al. ............. 340/825.05
4,573,045  2/1986  Galin ................................. 340/825.5
4,633,462  12/1986  Stifle et al. ............................ 370/85

OTHER PUBLICATIONS

Alvarez et al., NTC '80, Houston, Tex., vol. 2, pp. 37.3.1–37.3.7.
Haung et al., Electronic Design, vol. 32, No. 15, Jul. 26, 1984, pp. 221–228.
Moustakas et al., Journal Lightwave Tech., vol. LT-3, No. 1, Feb. 1985, pp. 93–99.
Hakamada et al., Journal Lightwave Tech., vol. LT-3, No. 3, Jun. 1985, pp. 511–524.
Lo et al., ICC '85, Chicago, Ill., vol. 1, pp. 3.4.1–3.4.5, 6/23–26, 1985.
Frost et al., 10th Conf. on Loc. Comp. Ntwks., Minneapolis, Minn., Oct. 1985, pp. 10–19.
Soueid et al., 10 Conf. on Loc. Comp. Ntwks., Minneapolis, Minn., Oct. 1985, pp. 54–59.
Wang et al., 10th Conf. on Loc. Comp. Ntwks., Minneapolis, Minn., Oct. 1985, pp. 61–67.
Reedy et al., IEEE Jnl. Sel. Areas in Comm., vol. SAC-3, No. 6, Nov. 1985, pp. 890–896.

Primary Examiner—Douglas W. Olms
Assistant Examiner—Frank M. Scutch, III
Attorney, Agent, or Firm—Erwin W. Pfeifle

[57] ABSTRACT

The present invention relates to a collision detection technique for an optical Star LAN using CSMA/CD. The present technique is implemented by preferably adding two or more fixed Hamming weight sequences, e.g., a fixed even or odd number of 1's in each unique cyclic error correcting code word, to the preamble section of each packet of information to be transmitted. These collision detection sequences have a length which is beyond the vulnerable time period of the CSMA/CD protocol (maximum round-trip propagation delay for each packet) by at least one code word length in order to prevent any misdetection, or false detection, of a collision. Each receiver in the listening period, looks for a code pattern with a fixed Hamming weight. When code patterns collide, the Hamming weight of the resulting code word in the collision period will exceed the nominal sequence weight (will include more 1's than the fixed Hamming weight) and a sequence weight violation is detected. Such detection is used to stop the transceivers from transmitting over the LAN and restart the network in order to avoid further collisions and network chaos.

13 Claims, 4 Drawing Figures

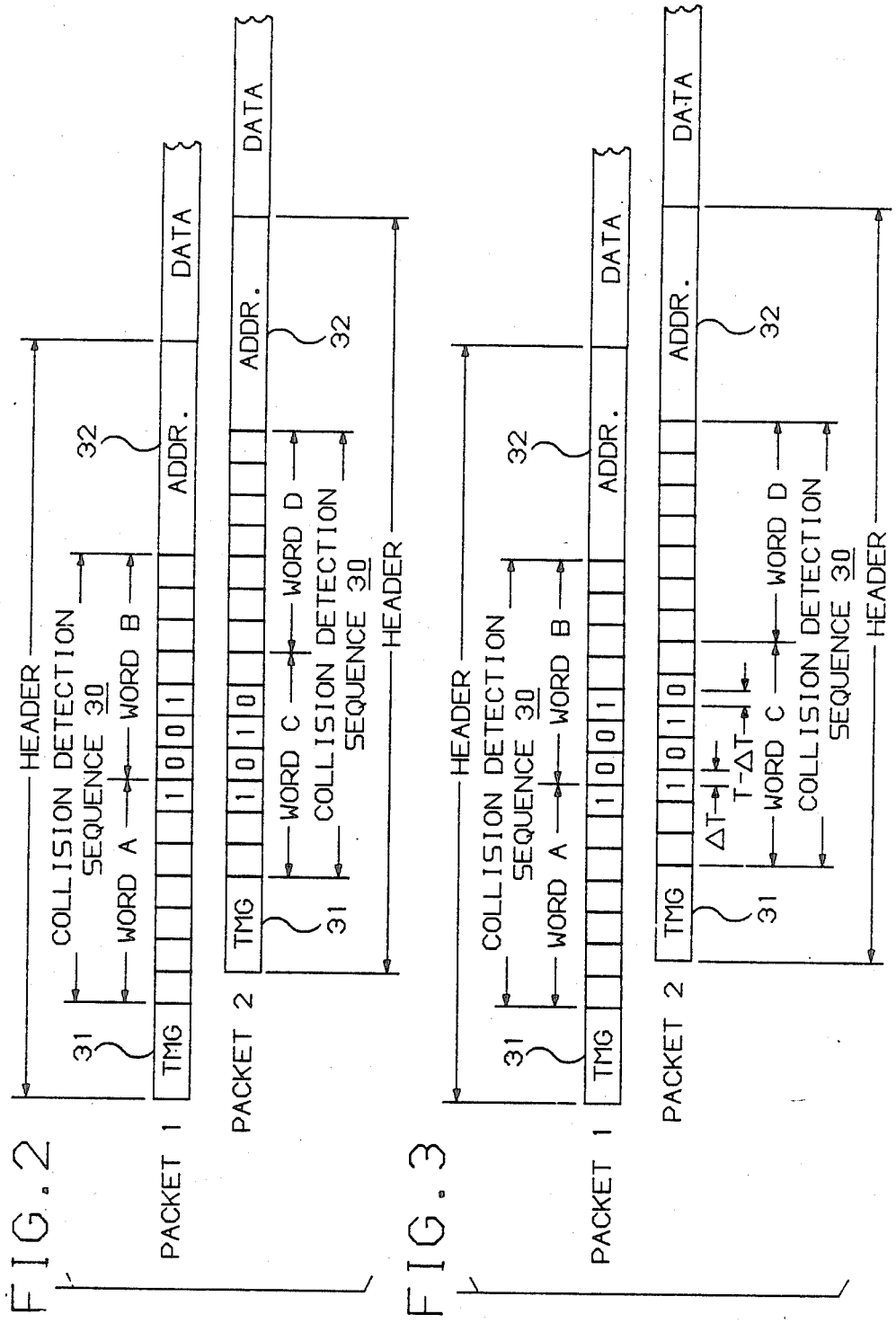

COLLISION DETECTION TECHNIQUE FOR AN OPTICAL PASSIVE STAR LOCAL AREA NETWORK USING CSMA/CD

TECHNICAL FIELD

The present invention relates to a collision detection technique for an optical passive star local area network using CSMA/CD. More particularly, the present collision detection technique is implemented by preferably adding two or more optimal fixed Hamming weight code words, e.g., a fixed even or odd number of ones in each unique code word, to the preamble section of each information packet transmitted. The collision detection sequences have a length which, in time, is beyond the vulnerable time period of the CSMA/CD protocol (maximum round-trip delay for all network stations) in order to prevent misdetection or false detection of a collision.

DESCRIPTION OF THE PRIOR ART

Recent advances in automated offices and industrial facilities have increased the demand for Local Area Networks (LANs) of which optical LANs provide a high speed environment. Of the optical LANs, a star topology has been recommended for certain applications since it exploits the fiber optic technology to its fullest capability as point-to-point links. The centralized wiring topology is flexible and well suited to the design of an optical LAN that can accommodate various diverse requirements imposed by the office of the future and fully automated factory floors and hospital information systems.

It is, however, believed that unique system approaches are necessary when fiber optic technology is employed in traditional LAN architectures that were originally developed for other communication media. For example, collision detection is fairly simple to implement in baseband coaxial carrier sense multiple access (CSMA) networks. In a coaxial bus system operating based on CSMA with collision detection (CSMA/CD), such as the well-known "Ethernet" system, collisions can be detected by, for example, Manchester encoding of transmitted data. As described in the article "Manchester Chip Eases The Design of Ethernet Systems" by H-M. Haung et al. in *Electronic Design*, Vol. 32, No. 15, July 16, 1984, at pages 221-228, this is basically a mapping of every on and off pulse to a dibit consisting of a one and a zero in a pre-assigned order. Then by monitoring the d.c. level variations due to collisions, one can easily detect a collision. This technique works well because the d.c. level attenuation is very small using coaxial cable over a span of less than one kilometer when transmitters have a uniform output level.

In optical fiber systems, however, there may be large differences in the signal strength as seen by a given receiver, where variations are due to fiber losses, optical source outputs and network topology. Therefore, it is possible for a strong signal to mask out the weaker signal such that a receiving station cannot detect the occurrence of a collision. This problem is more pronounced on a bus topology.

In CSMA, medium size traffic users sense the medium before they transmit. In other words, transmitters listen to the channel before they transmit. Once the channel is sensed idle, the call originator starts transmission. Collisions may occur if a station starts transmission within the maximum round trip end-to-end propagation delay, $2T_{max}$ of all network stations. Therefore, the collision time window $2T_{max}$ is much smaller than the packet length, and collisions can only occur within a $2T_{max}$ length segment of a packet.

If collisions are detected, the throughput of CSMA can increase since only a small fraction of a packet is destroyed in a collision. Once a collision is detected, the network is jammed and all stations are informed to stop transmission over the LAN. The article "Methods Of Collision Detection In Fiber Optic CSMA/CD Networks" by J. W. Reedy et al. in *IEEE Journal On Selected Areas In Communications*, Vol. SAC-3, No. 6, November 1985 at pages 890-896 discusses seven methods for detecting collisions in fiber optic networks employing CSMA/CD. The focus of the article is on collision detection accuracy, dynamic range, simplicity and reliability. Some of these methods that use a passive Star coupler nearly meet the collision dynamic range or reliability standards of IEEE 802.3 as discussed at page 891 of this article.

The problem remaining in the prior art is to provide a collision detection technique for use in optical networks employing CSMA/CD which can tolerate far wider dynamic range variations compared to the known methods and at the same time can be simple to implement and reliable.

SUMMARY OF THE INVENTION

The foregoing problem in the prior art has been solved in accordance with the present invention which relates to a collision detection technique for an optical passive Star Local Area Network (LAN) using Carrier Sense Multiple Access with Collision Detection (CSMA/CD). More particularly, the present collision detection technique is implemented by preferably adding two or more fixed Hamming weight code words, e.g., a fixed even or odd number of ones in each unique code word, to the preamble section of each information packet that is transmitted. The collision detection sequences have a length which extends beyond the vulnerable time period of the CSMA/CD protocol (maximum round-trip delay for all network stations) in order to prevent misdection or false detection of a collision. The overlap in time is at least equal to one code word.

Other and further aspects of the present invention will become apparent during the course of the following description and by reference to the accompanying drawings.

BRIEF DESCRIPTION OF THE DRAWINGS

Referring now to the drawings in which like numerals represent like elements in the several views:

FIG. 2 illustrates a portion of a collision detection sequence with full bit overlap between words;

FIG. 3 illustrates a portion of a collision detection sequence with a fractional bit overlap between words.

DETAILED DESCRIPTION

Figure 1:
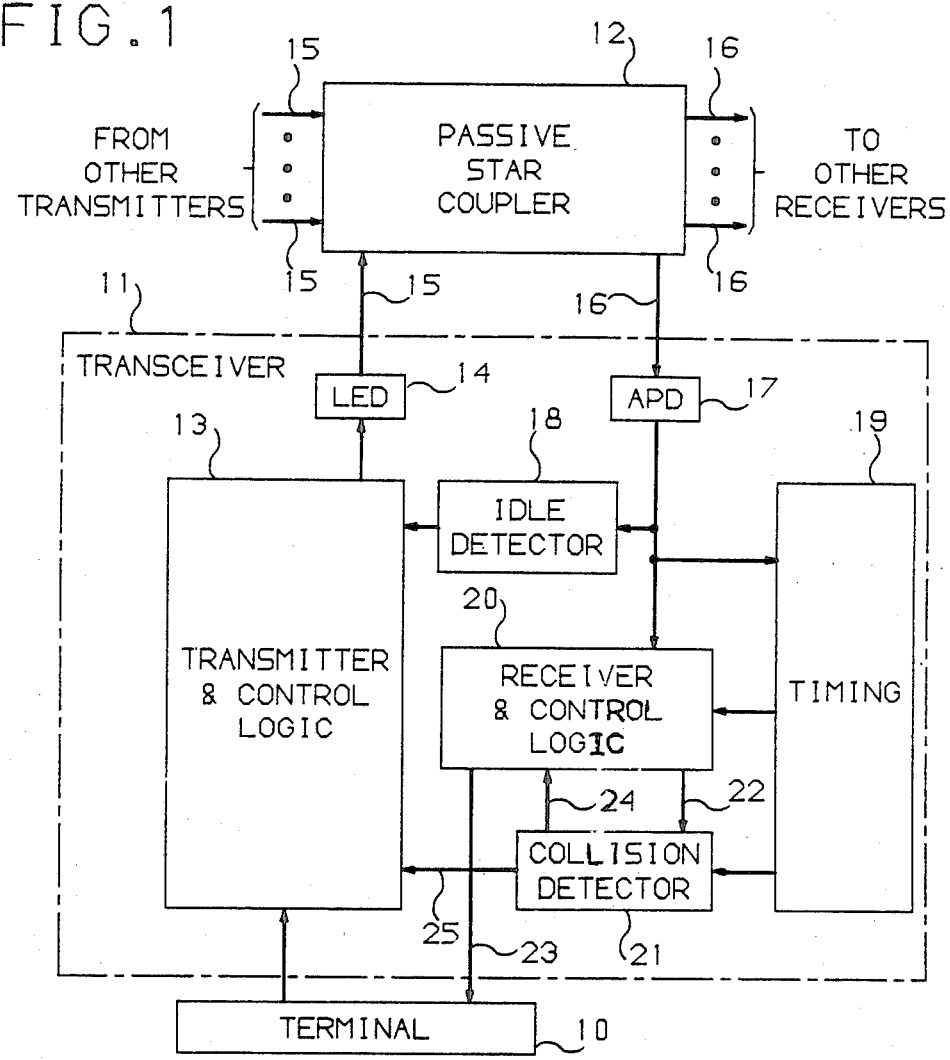
FIG. 1 is a block diagram of an optical Local Area Network including an expanded block diagram of a transceiver in accordance with the present invention.

FIG. 1 is a block diagram of a Carrier Sense Multiple Access (CSMA) optical Local Area Network (LAN)

wherein a terminal 10 transmits and receives communications from other terminals via a transceiver 11 which is coupled to a passive Star coupler 12 interconnecting all transceivers. In accordance with the present invention, the transceivers 11 use a collision detection technique which operates based on a sequence weight violation (SWV) rule using sequences of predetermined fixed Hamming weight constructed from cyclic error correcting codes as will be explained in greater detail after describing the general arrangement of the LAN of FIG. 1 for a clearer understanding of the technique.

In transceiver 11, packets of information to be transmitted over the LAN are sequentially received from terminal 10 in a transmitter and control logic circuit 13 which adds pertinent header, or preamble, information to each packet of information. The output signal from transmitter and control logic circuit 13 is then delivered to a light transmitting device such as, for example, a Light Emitting Diode (LED) 14, which converts the electrical signal from circuit 13 to a lightwave signal for transmission over a fiber 15 to passive Star coupler 12. The lightwave signals from all transceivers of the LAN are received by Star coupler 12 and distributed to all output ports and the associated output fibers 16 for delivery back to the transceivers 11 of the LAN.

The signals propagating along a fiber 16 from each output port of Star coupler 12 are received by an Avalanche Photodiode (APD) 17 in the receiver portion of the associated transceiver 11. APD 17 functions to detect a lightwave signal arriving on fiber 16 and convert the lightwave signal into an electric waveform output signal which is delivered to an idle detector 18. Idle detector 18 functions to monitor the received signals at all times and determine whether the channel is active or idle at any instant of time. If idle detector 18 finds the channel is active, e.g., receiving optical power on the channel, detector 18 sends a disable signal to transmitter and control logic circuit 13 to prevent circuit 13 from transmitting signals to Star coupler 12 and thereby cause a collision. Idle detector can comprise any suitable circuit as, for example, an energy sensor.

The received signal after passing through APD 17 is also received by both a timing circuit 19 and a receiver and control logic circuit 20. Timing circuit 19 functions to provide an output clock signal which provides bit and word timing for both the receiver and control logic circuit 20 and a collision detector arrangement 21. Timing circuit 19 can comprise any of the well-known timing circuits for taking a received waveform and providing synchronized bit and word output timing signals. Receiver and control logic circuit 20 functions to (a) transmit the pertinent header information to collision detector 21 via lead 22, (b) determine from address information whether the received packet is destined for terminal 10 of the LAN, and (c) send any remaining information such as, for example, the data contained in the packet of information to terminal 10 via lead 23 when the data within the packet is destined for terminal 10. Collision detector 21 generally functions to determine, from the packet header information which is received from receiver and control logic circuit 20, whether or not two or more packets of information have collided while propagating through Star coupler 12 during each packet vulnerable time period. The method which permits collision detector 21 to determine whether or not a collision has occurred in accordance with the present invention will be described in detail hereinafter.

Once collision detector 21 determines that the received header information indicates that the received packet has not collided with another packet within the network, it transmits an enable signal to receiver and control logic circuit 20 over lead 24 to permit a destination check by receiver and control logic circuit 20 and data information in that packet to be sent to terminal 10 over lead 23 if the packet has been determined to be destined for terminal 10 by circuit 20. If, alternatively, collision detector 21 determines that the received packet of information comprises information of packets which have collided in the network, then collision detector 21 transmits a disable control signal to both receiver and control logic circuit 20, over lead 24, and transmitter and control logic circuit 13 over lead 25. Such disable, or jamming, control signal prevents receiver and control logic circuit 20 from transmitting received packet information to terminal 10 and prevents transmitter and control logic circuit 13 from transmitting the next packet to LED 14 for transmission to Star coupler 12. In other words, in case of a collision being detected, all transceivers of the LAN will detect such collision and each transceiver will be jammed or disabled. The transmitters thereof are effectively instructed to back off and retransmit after a random delay. If this were not done, the collisions would increase as the initial colliding transceivers tried to retransmit at another time thereby possible colliding with more transceiver packets, etc. until the LAN was in chaos.

The present invention uses a sequence weight violation (SWV) technique for collision detection in a CSMA optical LAN which is very robust and simple compared to the seven methods described in the article by J. W. Reedy in *IEEE Journal On Selected Areas In Communications*, Vol. SAC-3, No. 6, November 1985, at pages 890–896. More particularly, the technique assigns a short sequence of, for example, 100 bits preferably comprising a few (at least two) repeated fixed Hamming weight code words from a cyclic error correcting code to every packet having an exemplary length of typically a few thousand bits. Each transceiver 11 of the LAN is assigned a unique short collision detection sequence which is placed near the beginning of the header information in every packet by the transmitter and control logic circuit 13 before the packet is transmitted from that transceiver. For purposes of explanation hereinafter, it will be assumed that the predetermined cyclic error correcting code used is that of a Golay code with a predetermined code word Hamming weight. It should be understood that any other suitable cyclic error correcting code can also be used by each transceiver, such as, for example, the Hamming or Bose-Chaudhuri-Hocquenhem (B.C.H.) codes.

The sequences used by the transceivers 13 of the LAN are designed to have, for example, a given Hamming weight and a given minimum distance from one another. Since a collision can only occur within the maximum round trip end-to-end propagation delay, $2T_{max}$, then once this period is over, normal transmission by a station commences. The present collision detection sequence covers this interval plus the length of one code word as will be explained hereinafter. The remainder of the packet header comprises timing and address bits. It should be noted that the extra bits assigned to the collision detection sequence in the packet header only reduces the throughput by a negligible amount. The sequence are selected such that once collided, they result in a Hamming weight larger than the nominal weight of each assigned sequence. Therefore, by monitoring the packet header, a collision can be easily detected. This is done by counting the Hamming weight of the received sequence and comparing it to a collision weight threshold. If the threshold is exceeded, a collision is declared by collision detector 21 and the LAN is jammed. Otherwise the transceivers 11 continue transmissions.

The principal concept concerning collision detector 21 based on a SWV technique is to let each transmitter 13 attach a unique collision detection sequence to each packet in the manner shown in FIGS. 2 and 3. The collision detection sequence in section 30 immediately follows the bit and word timing sequence in section 31 in the beginning of the header portion of a packet, and precedes the timing and address information in header portion 32. It will be assumed hereinafter that each bit is transmitted by means of on ("1") and off ("0") keying and that a non-return to zero (NRZ) format is used. The collision detection sequences should be chosen in such a way that a collision is easily detected and such that the probability of failure to detect a sequence is low. Since collisions can occur within a certain interval of relative time delay between two involved packets, the sequences must be such that collision detection works for any relative time shift between them. It is also preferable from the sequences that for any time shift between two packets, a collision involving a weak signal packet is identified when a minimum number of "1"-s are visible in the received "0"-s of a strong signal packet. Of course, if a colliding weak "1" overlaps a received strong "1", then the former is masked-out and cannot be detected. It is clear, therefore, that the collision detection sequence for a certain packet should be a mixture of "1"-s and "0"-s such that it is visible when it collides with a strong signal packet but also that it allows other weak colliding packets to be visible when they collide with the given sequence. In the latter case, the sequence must contain enough "0"-s so that enough of the colliding "1"-s are not masked-out.

In accordance with the present invention, collision detection sequences are constructed using the theory of cyclic error-correcting codes. It will be assumed that collision detection sequences are used that consist of words from a linear cyclic error-correcting code of length N bit intervals and a minimum Hamming distance, $d_{min}$. Then, in the collision detection portion 30 of the packet, the code word is repeated at least once. The collision detection sequence length should be such that L.NT (L repeated words) is larger than the largest relative time shift that can occur in any collision in the network, where T is the time period of one bit. The sequence length should be chosen such that the overlap within the collision detection window time equals at least the length of one code word.

The following description is designed to provide an understanding of the problem of designing sequences suitable for collision detection and the theory of cyclic codes will be used to satisfy some of the previously described constraints. To illustrate what happens in a collision, the bit synchronous collision at an otherwise arbitrary relative time delay is illustrated in FIG. 2. Collisions can, of course happen at any relative time delay within an interval as illustrated in FIG. 3. For simplicity of analysis, the bit synchronous collision as shown in FIG. 2 will be described first. As shown in FIG. 2, it will be assumed that a collision between two packets occurs at a relative discrete bit time shift yielding full bit hits. Furthermore, it will be assumed that a word C in packet 2 in FIG. 2 is within the time interval of a word A and a word B of packet 1. Let word A be a code word of Hamming weight $W_o$ from a binary cyclic error-correcting code with code word length N and a minimum Hamming distance $d_{min}$. Let (1) word B be identical to word A, (2) word D be identical to word C, and (3) word C be such that it belongs to the same cyclic code as word A and has the same Hamming weight $W_o$ but differs from word A and any cyclic permutation of word A. By definition, all cyclic permutations of any code word in a cyclic code is also a code word in the same code.

By selecting the collision detection sequence according to the above rules, it is possible to guarantee a worst case separation between colliding sequences at any relative time delay. Since words A and C are words in the same cyclic code, it is known that word C and any cyclic shift of word A are different in at least $d_{min}$ positions. Thus, it becomes certain that word C and that portion of word A and B in packet 1 are different in at least $d_{min}$ positions for any delay difference in the specified time window since words A and B are identical words and the N bits covered by word C of packet 2, denoted hereinafter as $A_p$, is always a cyclic permutation of word A.

If there is no collision, the weight count over word A and B is $2W_o$. When a bit synchronous collision occurs involving full hits as shown in FIG. 2, the minimum number of "on" pulses, or "1"-s, contributed by the colliding packet sequence as designated $W_c$ is equal to $$\left[\frac{d_{min} + 1}{2}\right]$$

where the brackets mean "the nearest integer smaller than or equal to". Thus the overall count of a bit synchronous collision is at least $2W_o + W_c$. The derived value of $W_c$ follows from the fact that both word C and any cyclic permutation of word A, denoted $A_p$, have a constant weight $W_o$ and that the number of positions where the words are different is at least $d_{min}$. The positions in the two code words can be different in two ways, namely a "1" in word C and a "0" in $A_p$, or a "0" in word C and a "1" in $A_p$. Only the first type of difference contributes to the weight count in collision detector 21. Due to symmetry in the constant weight code word case, there are equally many of each type of difference. For even minimum Hamming distance, the number is at least $d_{min}/2$ and for an odd Hamming distance, this number is at least $$\frac{d_{min} + 1}{2},$$

yielding the expression for $W_c$ provided above.

FIG. 3 illustrates the more general case where the time delay difference between packets 1 and 2 is not an integer multiple of a bit time interval, yielding fractional bit time hits. It must be realized that there are two types of fractional bit hits that contribute to the hit count in the collision detection, namely, a "1" in word C overlapping $\Delta T$ of a "0" in word $A_p$ and a "1" in word C overlapping the remaining part, $T - \Delta T$, of a "0" in word $A_p$. There are at least $W_C$ of each of these two types. Sometimes, the two fractional types of hits appear in the same word $A_p$, making it a full hit rather than two fractional bit hits. For the general case, $W_C$ is based on the smallest distance between two code words involved in a hit. In general the distance is larger, and, furthermore, the bits in word D contribute to the count and improve the average performance.

Suitable sequences can be selected by using the properties of well known cyclic error-correcting block codes. The length of the sequence is given by the maximum relative propagation time difference in a collision and the system bit rate. At the given sequence length of N bits, there are two somewhat contradictory requirements on the sequences. Obviously the largest possible minimum distance, $d_{min}$, between sequences should be chosen. However, there should be a sufficiently large number of sequences (M) available in the LAN so that each user has its own unique, constant weight, sequence. To obtain the largest number of sequences, M, at a given $d_{min}$, the best choice of sequence weight $W_0$ is in most cases close to [N/2]. For the present case, only one of the cyclic permutations of a given code word of weight $W_0$ is a useful sequence. The weight distribution of the cyclic code is A(j), j=0,1, ... N, where A(j) is the number of code words of Hamming weight j. Thus the number of useful sequences of weight $W_0$ is lower bounded by $$M \geq \left[ \frac{A(W_o)}{N} \right] = A'(W_o). \tag{1}$$

As an example, the cyclic Golay code will be used to construct collision sequences. For this code, the code word length is N=23, the number of code words is $2^{12}$ and the minimum Hamming distance is $d_{min}=7$. The weight distribution of this code is well known. Thus, e.g., A(8)=A(15)=506, A(11)=A(12)=1288 and A'(8)=A'(15)=22, A'(11)=A'(12)=56, respectively. The generator polynomial is $$g(x)=x^{11}+x^{10}+x^6+x^5+x^4+x^2+1 \tag{2}$$

Two possible collision sequences of weight 8 are:

11000000000010100100111
10000000001111011010000. (3)

From the example, it can be seen that the Hamming distance between the two sequences is 12 and that at least $W_C=4$ of the colliding 1's are overlapping zeros in the other sequence at any cyclic shift. By shifting one of the sequences cyclically, the distance varies and at some point it is 8.

Figure 4:
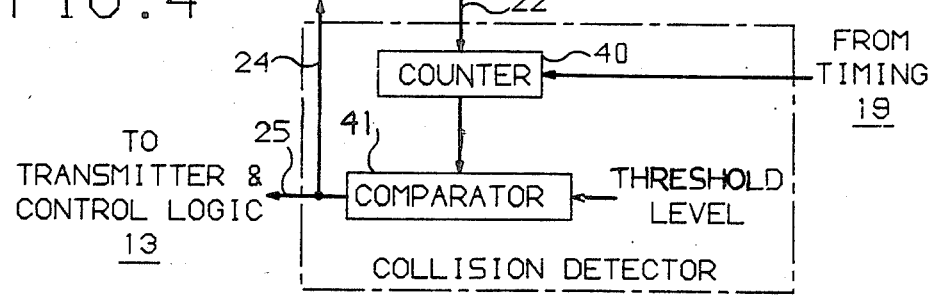
FIG. 4 is a block diagram of an exemplary collision detector for use in FIG. 1.

As shown in FIG. 4, collision detector 21 receives the collision detection sequence in portion 30 of the header from receiver and control logic circuit 20 in a counter 40. Counter 40 functions to use the timing signals from timing circuit 19 to count the 1's in the received collision detection sequence. At the conclusion of the collision detection sequence, the total count is transmitted to a comparator 41 which compares the count with a predetermined threshold level corresponding to a predetermined Hamming weight. As described previously, if the Hamming weight does not exceed the threshold, a collision is not detected and normal operation continues. If a collision is detected, then comparator transmits a disable signal to receiver and control logic circuit 20 and transmitter and control logic circuit 13.

It is to be understood that the above-described embodiments are simply illustrative of the principles of the invention. Various other modifications and changes may be made by those skilled in the art which will embody the principles of the invention and fall within the spirit and scope thereof. For example, in many LAN's, Manchester coding is used as a standard. Furthermore, by using Manchester coding, the signal is DC-balanced independent of data sequences. The SWV rule and the sequences derived for the NRZ coding can also be used for the Manchester coding case. However, now, the weight count should be performed for "chips" rather than bits. In the Manchester code, each bit is transformed into two "chips", where, e.g., a "1" is represented by 01 and a "0" is represented by 10. It is immediately clear that the noiseless Hamming weight for the chip count in the full bit hit case is $2W_c$ rather than $W_c$ for NRZ. Furthermore, in the case where only partial bit hits occur, there are at most $4W_c$ incidences, of which some occur in the same bit and form full bit hits. It is also to be understood that LED 14 and APD 17 can be replaced by any other suitable device such as, for example, a laser or PIN diode, respectively. Additionally, the invention described alleviates the need for a centralized jamming signal transmission since the collisions are detected at every station reliably. Although the invention was described as using at least two repeated code words, the present invention could use a single code word of N bit length and still work.

What is claimed is:

1. A collision detection arrangement for use in a receiver of a Carrier Sense Multiple Access Collision Detection (CSMA/CD) communication network transceiver, the arrangement comprising:

an input terminal for receiving a signal from the network including a packet of information which was originally transmitted comprising a preamble section including a collision detection sequence of length N bit intervals and a predetermined Hamming weight, where each transceiver of the network is assigned a separate collision detection sequence;

means responsive to a collision detection sequence received at the input terminal for determining the Hamming weight of the collision detection sequence and for generating an output signal representative of such weight; and means responsive to the output signal from the determining and generating means for comparing the Hamming weight of the received collision detection sequence with a predetermined threshold Hamming weight and for generating an output signal indicative of a collision of packets of information when the Hamming weight determination exceeds the threshold Hamming weight.

2. A collision detection arrangement according to claim 1 wherein the collision detection sequence comprises a cyclic error correcting code word which is repeated at least once in the collision detection sequence.

3. A collision detection arrangement according to claim 1 or 2 wherein the collision detection sequence is disposed near the beginning of the preamble section and includes a length which is longer than a maximum round-trip propagation delay plus one code word length for a packet of information propagating in the network.

4. A transceiver for use in a Carrier Sense Multiple Access Collision Detection (CSMA/CD) communication network where the transceiver is associated with a separate user of the network, the transceiver comprising:

- a transmitter for receiving signals from the associated user and being responsive to a control signal indicating an apparent idle period in the network for transmitting a packet of information comprising a preamble section including a collision detection sequence of length N bit intervals with a predetermined Hamming word weight, which sequence is unique for each transceiver of the communication network; and
- a receiver for receiving signals from the network comprising:
- collision detection means responsive to each received collision detection sequence for determining the Hamming weight of the collision detection sequence, and for generating a control signal indicative of a collision of two packets on the transmission medium for disabling both the transmitter and the receiver for a period of time when the Hamming weight exceeds a predetermined Hamming weight threshold value.

5. A transceiver according to claim 4 wherein the receiver further comprises:

- idle detection means responsive to a received signal from the network for detecting when no packet of information is being received and for generating a control signal to the transmitter to initiate the transmission of a packet of information over the network; and
- means for determining from the received signals if an included packet of information is destined for the associated user and for transmitting such packet information to the associated user.

6. A transceiver according to claim 4 or 5 wherein the collision detection means comprises:

- means responsive to a received collision detection sequence for determining the Hamming weight of the sequence and for generating an output signal representative of such Hamming weight; and
- comparing means responsive to the output signal from the determining and generating means for comparing the Hamming weight indication with a predetermined Hamming weight threshold value and for generating the control signal for disabling both the transmitter and the determining means of the receiver when the Hamming weight indication exceeds the Hamming weight threshold value.

7. A transceiver according to claim 6 wherein the collision detection sequence comprises a cyclic error correcting code word which is repeated at least once in the collision detection sequence.

8. A transceiver according to claim 6 wherein the collision detection sequence is disposed near the beginning of the preamble section and includes a length which is longer than a maximum round-trip propagation delay for a packet of information propagating in the network plus one code word length.

9. A transceiver according to claim 4 or 5 wherein the collision detection sequence comprises a cyclic error correcting code which is repeated at least once in the collision detection sequence.

10. A transceiver according to claim 4 or 5 wherein the collision detection sequence is disposed near the beginning of the preamble section and includes a length which is longer than a maximum round-trip propagation delay for a packet of information propagating in the network plus one code word length.

11. A method for detecting collisions in a Carrier Sense Multiple Access (CSMA) communication network, the method comprising the steps of:

at each transceiver of the network,

- (a) transmitting a packet of information including a collision detection sequence in a preamble section of the packet when the transceiver determines that no other transceiver of the network appears to be instituting the transmission of a packet of information at that time, the collision detection sequence of length N bit intervals with a predetermined Hamming weight where the sequence is unique for each transceiver of the network;
- (b) determining the Hamming weight of the collision detection sequence included in the preamble section of each packet of information received from the network;
- (c) comparing the Hamming weight determined in step (b) with a predetermined Hamming weight threshold value corresponding to the Hamming weight of a collision detection sequence transmitted in step (a); and
- (d) disabling the transceiver for a predetermined period of time if it has been determined in step (c) that the determined Hamming weight of step (b) exceeds the Hamming weight threshold value.

12. The method according to claim 11 wherein in performing step (a), the collision detection sequence which is transmitted comprises a cyclic error correcting code word which is repeated at least once within the sequence.

13. The method according to claim 11 wherein in performing step (a), the collision detection sequence which is transmitted is disposed near the beginning of the preamble section of each packet of information and includes a length which is longer than a maximum round-trip propagation delay for a packet propagating in the network plus one code word length.

* * * * *